(12) United States Patent
Wendling et al.

(10) Patent No.: US 9,525,688 B2
(45) Date of Patent: Dec. 20, 2016

(54) ELECTRONIC SUPPORT ALLOWING ACCESS TO REMOTE AUDIO/VIDEO ASSETS

(71) Applicant: NAGRAVISION S.A., Cheseaux-sur-Lausanne (CH)

(72) Inventors: Bertrand Wendling, Divonne-les-Bains (FR); Henri Kudelski, Chexbres (CH); Pierre Sarda, Echallens (CH); Alain Delpuch, Paris (FR)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 0 days.

(21) Appl. No.: 14/204,391

(22) Filed: Mar. 11, 2014

(65) Prior Publication Data

US 2014/0259181 A1    Sep. 11, 2014

Related U.S. Application Data

(60) Provisional application No. 61/775,733, filed on Mar. 11, 2013, provisional application No. 61/775,737, (Continued)

(51) Int. Cl.
*H04N 21/84* (2011.01)
*H04L 29/06* (2006.01)
*H04N 21/418* (2011.01)
*H04N 21/4363* (2011.01)
*H04N 21/4627* (2011.01)
(Continued)

(52) U.S. Cl.
CPC .......... *H04L 63/10* (2013.01); *H04N 21/2541* (2013.01); *H04N 21/4181* (2013.01); *H04N 21/4185* (2013.01); *H04N 21/4367* (2013.01); *H04N 21/43637* (2013.01);
(Continued)

(58) Field of Classification Search
USPC .......................................................... 725/25
See application file for complete search history.

(56) References Cited

U.S. PATENT DOCUMENTS 7,697,686 B2 * 4/2010 Puiatti .................... H04N 5/913
348/E7.056
2006/0103535 A1    5/2006 Pahlaven et al.
(Continued)

FOREIGN PATENT DOCUMENTS

EP    2779671    9/2014

OTHER PUBLICATIONS

European Search Report issued in European Application No. 14158739 dated Mar. 2, 2015.
(Continued)

*Primary Examiner* — Kieu Oanh T Bui
(74) *Attorney, Agent, or Firm* — DLA Piper LLP (US)

(57) ABSTRACT

A physical device, the possession of which may provide access to digital media content in a fashion similar to the possession of a DVD providing access to the media content stored thereupon on a suitable DVD player. The possession of the physical device grants access to digital content stored on a remote server using a suitable device such as e.g., a set-top box or media player having Internet connectivity. The physical device provides for convenient and possibly anonymous access to content stored on a remote server and has certain advantages over known techniques for storing rights to access the content.

18 Claims, 2 Drawing Sheets

Related U.S. Application Data filed on Mar. 11, 2013, provisional application No. 61/775,802, filed on Mar. 11, 2013.

(51) Int. Cl.
*H04N 21/472* (2011.01)
*H04N 21/8355* (2011.01)
*H04N 21/254* (2011.01)
*H04N 21/4185* (2011.01)
*H04N 21/4367* (2011.01)

(52) U.S. Cl.
CPC ... *H04N 21/4627* (2013.01); *H04N 21/47202* (2013.01); *H04N 21/8355* (2013.01)

(56) References Cited

U.S. PATENT DOCUMENTS

| | | |
|---|---|---|
| 2011/0183717 A1 | 7/2011 | Brede |
| 2012/0071214 A1 | 3/2012 | Ash, Jr. et al. |
| 2012/0185695 A1 | 7/2012 | Shah et al. |
| 2012/0204206 A1 | 8/2012 | Gutierrez Prieto et al. |
| 2014/0020073 A1* | 1/2014 | Ronda .................. G06F 21/31 726/7 |
| 2014/0127995 A1 | 5/2014 | Hendricksen et al. |
| 2014/0152425 A1 | 6/2014 | Valentine et al. |
| 2014/0273822 A1 | 9/2014 | Gutierrez |
| 2015/0116296 A1 | 4/2015 | Greene |
| 2015/0363988 A1 | 12/2015 | Van Wiemeersch et al. |

OTHER PUBLICATIONS

European Search Report issued in European Application No. 14197746 dated Jun. 11, 2015.

Russell Holly, "NFC Case for the iPhone Landing Shortly . . . If Apple Says OK", retrieved from http://www.geek.com/apple/nfc-case-for-the-iphone-1467957/, dated Feb. 16, 2012 (4 pages).

Rian Boden et al., "Wireless Dynamics Launches NFC Case for iPhone 5", retrieved from http://www.nfcworld.com/2013/06/13/324597/wireless-dynamics-launches-nfc-case-for-iphone-5/, dated Jun. 13, 2013 (4 pages).

U.S. Appl. No. 14/962,514.

\* cited by examiner

| A_ID | VAR | M_DATA | SIG |

Fig. 2

ELECTRONIC SUPPORT ALLOWING ACCESS TO REMOTE AUDIO/VIDEO ASSETS

CROSS REFERENCE TO RELATED APPLICATIONS

This application claims the benefit of U.S. Provisional Applications Nos. 61/775,733, filed Mar. 11, 2013, 61/775,802, filed Mar. 11, 2013 and 61/775,737, filed Mar. 11, 2013. All of the foregoing are incorporated by reference in their entireties.

TECHNICAL FIELD

The embodiments disclosed herein generally relate to the field of digital right management. More specifically, the embodiments disclosed herein relate to innovations in the way digital rights for particular digital media assets may be managed in terms of their verification, transferring, lending or storing. The embodiments also relate to managing access rights where different levels of access to particular assets may be provided depending on a person's identity, or access to different assets or applications may be given depending on the particular device used to request such access and how that device is used.

STATE OF THE ART

Near field communication (NFC) is a set of standards for smart phones and similar devices, such as tablet computers, to establish radio communication with each other by touching them together or bringing them into close proximity, usually no more than a few centimeters. Present and anticipated applications include contactless transactions, data exchange, and simplified setup of more complex communications such as e.g., Wi-Fi. Communication is also possible between an NFC device and a non-powered NFC chip, called a "tag".

NFC standards cover the NFC communication protocols and data exchange formats and are based on existing standards for radio frequency identification (RFID) such as ISO/IEC 14443, FeliCa and ISO/IEC 18092. They include standards defined by the "NFC Forum", which was founded in 2004 by Nokia, Philips and Sony and includes more than 180 members. The Forum also promotes NFC and certifies device compliance.

NFC builds upon RFID systems by allowing two-way communication between endpoints, whereas earlier systems such as contactless smart cards allowed only one-way communication.

NFC technology is usable only over a short distance of a few centimeters, which implies a voluntary use and prevents unintentional use.

NFC devices can be active or passive. A passive NFC device, such as a tag, a smart card or a simple chip affixed to an object contains information only readable by other NFC-enabled devices. A passive NFC device is powered by the electromagnetic field generated by a reader (active device) and therefore does not need its own power supply.

An active NFC device, however, is a device that generates an electromagnetic field. This generation can be done to communicate with a passive device (described above) or to establish a communication channel between two active devices.

The fact that a device like a smartphone has a power supply does not necessarily mean that it will work in active mode only. That is, a smartphone can handle the NFC interface in active or passive modes. In passive mode, the device emulates a chip card. In this mode, the smartphone (or any other portable device such as tablets) will store, in a secure memory, information that is normally stored in a card. Thus, when the smartphone detects an electromagnetic field, it can access the secure memory and a corresponding device having NFC capacities will be able to read information in passive mode from the secure memory.

Since non-powered NFC "tags" can also be read by NFC devices, NFC applications using such "tags" may be used to replace earlier one-way applications.

As well as having NFC capabilities embedded therein, state of the art smartphones and the like usually include some kind of sensor for detecting spatial position of the device such as e.g., positional detectors, tilt sensors, angle detectors, movement detectors or accelerometers. In the state of the art, for example, the accelerometer may be used to perform automatic picture rotation, provide input to motion-sensitive mini-games or to correct for shaking when taking photographs.

In a digital rights management context, there are different ways for a consumer to acquire rights to view a movie, for example, and ways for that consumer to prove that he/she has acquired such rights. For example, a consumer may either buy a DVD then view a movie on the DVD using a physical DVD player, or he/she may buy a right to view the movie on-line through streaming. In the latter case, the right is a virtual right and the consumer has nothing physical to prove ownership or otherwise prove legitimate acquisition of the right enabling him access the movie. This would be particularly problematic if the consumer's computer equipment breaks, causing him/her to lose the virtual proof of the acquired access rights, which generally would have been stored on the computer equipment. Furthermore, the consumer cannot pass the right on to his friends, nor could he/she exchange, donate or resell the right as he/she can do with a physical DVD.

In a context of parental control, access rights to certain content or applications may be controlled or otherwise managed by a designated person. In the state of the art, parental control is usually achieved by a parent (i.e., the designated person) inputting a PIN code using a remote control device. This technique is not secure in the sense that it is possible for the PIN code to be discovered by an unscrupulous child who spies on the parent when entering the PIN code.

SUMMARY

It can be seen that there is a need for convenient, yet secure means for providing access to remote video assets. The embodiments disclosed herein attempt to address such issues, using NFC technology to provide convenience as well as security in terms of the authentication and management of access rights.

According to an aspect of the embodiments disclosed herein, a system for providing access to conditional access digital media content is provided. The system comprising:

a receiver to receive the digital media content;

a media player, local to the receiver, for playing the digital media content;

a streaming server having access to the stored digital media content; and a secure element for providing authorization to access the stored digital media content;

wherein:

the receiver is configured to receive the digital media content from the streaming server via a remote connection;

the secure element is a physical element separate from the receiver, the secure element comprising a memory in which a cryptogram is prerecorded, the cryptogram comprising a right to access the digital media content; and the receiver is configured to receive the cryptogram from the secure element, the receiver being further configured to provide said access upon authentication of the cryptogram.

Embodiments disclosed herein therefore allow for the re-establishment of the ability to keep, display, collect, share, trade, lend and resell digital rights more reliably than virtual rights (e.g., even when a computer breaks down). This is made possible by having the right in the form of a physical item. Further embodiments disclosed herein provide for enhanced security for parental controls. Moreover, further embodiments comprise spatial positional detectors that may be used to activate functions such as the NFC function in a smartphone when a smartphone is used as a movie card or secure element—e.g., phone upside down activates application A, phone on its side activates application B. Other sensors can be used e.g., a microphone to input commands by voice, sensors for detecting e.g., an angle of the device. Other embodiments are disclosed wherein the receiver is connected to an NFC-enabled table, allowing e.g., for the selection of a channel by placing an NFC-enabled movie card for that channel on a table. For example, picture-in-picture mode may be invoked using two movie cards.

BRIEF DESCRIPTION OF THE DRAWINGS

Embodiments disclosed herein and their advantages will be better understood with reference to the enclosed drawing and to the following detailed description, in which:

FIG. 2 illustrates a schematic diagram of a cryptogram with management data as used in an embodiment disclosed herein.

DETAILED DESCRIPTION

Figure 1:
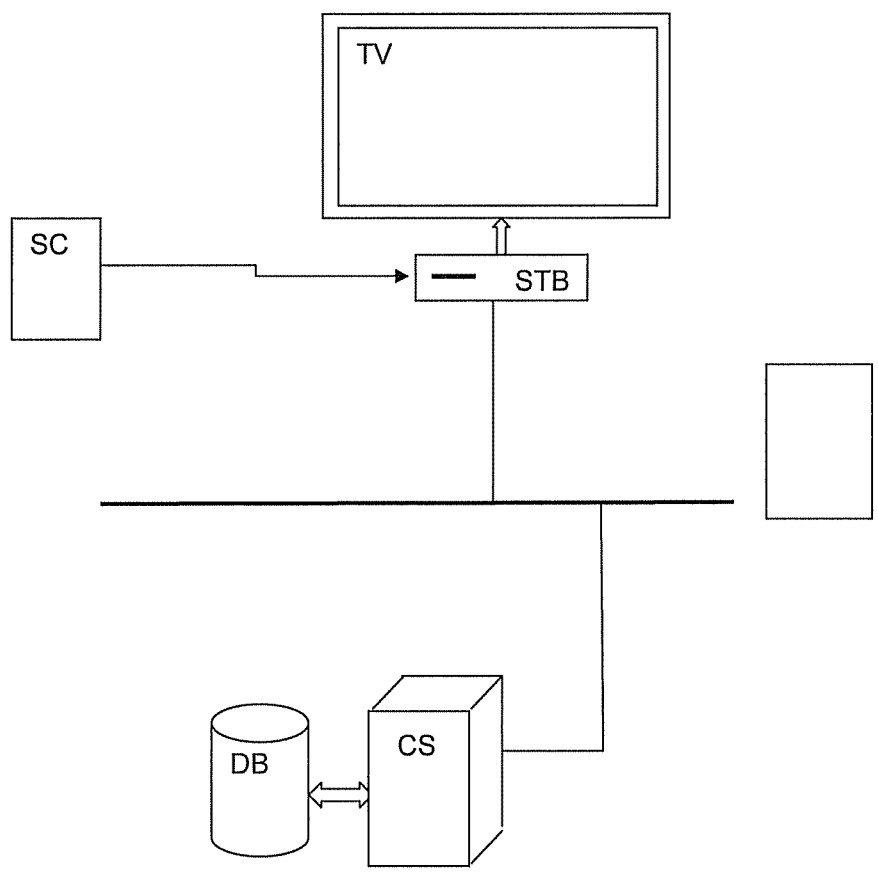
FIG. 1 illustrates a system in which a movie card according to an embodiment disclosed herein may be used.

According to an aspect of the embodiments disclosed herein, provisions are made for an item that contains the digital right for an asset. This would be in the form of a physical, tactile item that the consumer can keep, share or resell, for example. Advantages of using a physical, tactile item to hold the right over a virtual right include (without limitation) the ability to keep, display, collect, share, trade, lend and resell the item simply and efficiently.

In order to address the problems remaining in the prior art, related to the management of rights to digital assets, the disclosed embodiments provide a specific sellable device, such as a card or the like, comprising a passive NFC system. The device is used to securely store and communicate information such as e.g., a film identifier, streaming system identifier, protocol identifier or any necessary information that will be used to get access to the film via online means (such as rights, etc.). The device may have some specific packaging reminiscent of a traditional DVD (e.g., a film jacket or cover), since it is a physical, non-personalised object intended to show that whoever has physical possession of the object will be able to view the film depicted on the cover.

According to an embodiment disclosed herein, an active NFC-enabled device, connected to the Internet and a TV, is able to read the card or tag having the passive NFC system and retrieve information related to the film from the card, connect to the streaming server over the Internet (e.g., an ultraviolet streaming server), and thereby allow for the movie to be presented. The active NFC-enabled device mentioned herein is often referred to as a reader.

To start the movie, the user simply needs to present the card (hereinafter referred to as a "movie card") to the reader. According to different embodiments disclosed herein, further security may be added whereby certain authentication steps are carried out. Such authentication may use identity checking or other checks involving the use of positional sensors and the like in the card. These other embodiments are described in more detail below.

According to different embodiments, the reader may be an active NFC reader on a set-top box connected to a TV or the TV itself may be NFC-enabled and therefore serve as the reader. In both cases the TV is connected to the Internet.

Although NFC is mentioned herein as the communication-enabling feature in the context of the disclosed embodiments, other systems such as e.g., RFID may be used instead; RFID being another short-range wireless communication protocol. According to another embodiment disclosed herein, the movie card may be in the form of a physical card and may comprise a secure element such as a SIM card to store the information related to the film as described above. Consequently, the reader would have a SIM card reader to read the information allowing identification of the film to be downloaded. It is possible for the movie card to have the passive NFC system and the SIM card on-board.

According to yet another embodiment, it is possible for a suitably programmed Conditional Access Module (CAM), which is already widely used in the domain of broadcast of conditional access content, to function as a movie card. The STB or TV would have a suitable CAM reader, which would serve as the reader described above for reading the movie card and downloading the requested film.

Smartphones and tablet computers are handheld communication devices that generally come with NFC functionality and therefore may serve as convenient ways to perform the role of the movie card in the context of the embodiments described above.

Alternatively, using a movie card comprising a passive NFC system as described above, the movie purchased by the user of the movie card can be downloaded and visualized on an NFC-enabled smartphone, or NFC-enabled tablet computer, having access to the Internet. In this case, the movie card is read by the smartphone or tablet computer, which then may authenticate the information it reads using any of the techniques described below, and transmit the (authenticated) information to a central controller. The information includes a reference to a requested movie. If the information is valid, then the requested movie can be downloaded from the central controller to the phone or tablet computer, where it is made available for presentation.

The movie card system of the disclosed embodiments provides advantages in that the user is in possession of a physical entity related to a particular movie that was purchased. Depending on the embodiment, the physical entity is anonymous in the sense that it need not bear information associating the entity to a particular user. The user is then free to do what he/she wants with the right purchased via the movie card—i.e., the user is free to give the movie card to someone else to allow them to watch the film or the user can watch the film on any appropriate device. This is different from having purchased rights stored somewhere on a computer, perhaps being a personalized right, and being susceptible to loss, damage or corruption depending on the fate of the computer on which it is stored (e.g., crash, reformatting, etc.). Having a physical movie card of this sort is similar to having the physical DVD in one's possession even though the movie card is for streaming the movie from a server.

FIG. 1 shows a schematic diagram of a system in which an embodiment disclosed herein may be deployed. A movie card, according to an embodiment, may be in the physical form of a smartcard. In FIG. 1, the movie card is denoted SC. According to different embodiments, the movie card (in this case a smartcard) may be of the ISO7816 type (i.e., it has electrical contacts for communicating with a host device) or it may be an NFC-enabled card adapted to communicate with a host device using NFC. The movie card (SC) comprises a memory for storing a cryptogram representing an authorization to have access to a particular asset, such as a movie, a piece of music, a game, etc. In FIG. 1, the host device is labeled STB and indeed may be a set top box known in the pay-TV field. The host (STB) comprises a suitable reader for communicating with the movie card (SC), i.e., an ISO7816 reader, NFC reader, or a reader configured to operate with whatever communication protocol is used by the movie card (SC). The host (STB) is connected, via the Internet, to a central system (CS), which has access to a database (DB) where assets are stored. The host (STB) can therefore read information, including the cryptogram, from the movie card (SC) and send it to the central system (CS). The host (STB) may also send identification information, including an address, to the central system (CS) thereby allowing the central system to send the requested asset back to the host (STB).

Once the cryptogram is received by the host (STB), it is verified or otherwise authenticated. Various methods exist for checking the authenticity of a cryptogram, for example, known methods based on known asymmetric cryptography techniques or using an X.509 signature may be used.

Figure 2:
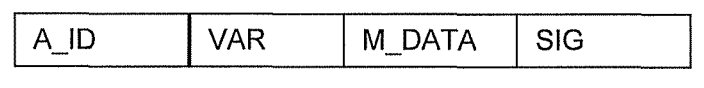

FIG. 2 shows a diagram representing a cryptogram used in embodiments disclosed herein. The cryptogram comprises a unique identifier of the asset, or asset identifier, (A_ID) and a signature (SIG). Once the verification is successfully carried out, the central system fetches the requested asset from the database (DB) and transmits it back to the host (STB).

In the case where the requested asset is a film, the host device is connected to a display device such as e.g., a TV. The requested asset, once received at the host, is then sent to the TV to be displayed.

The content that is transferred back to the host may be in encrypted form as known in the art. The purchaser of the movie card will have authorization, by virtue of the purchase of the right to view the movie, to decrypt the content. As is known, to be authorized a right has to be present in the set-top box (usually in a security device, which could be part of the movie card). With the right being present, the set-top box is allowed to decrypt the content.

As mentioned above, the normal procedure is for the host device (STB) to read the cryptogram from the movie card (SC). In a non-authorized mode, the host (STB) could store the cryptogram and then perform a repeat request to the central system for an asset by re-sending the stored cryptogram instead of reading the cryptogram from a movie card. In order to prevent unauthorized repeated use of an already performed request for an asset, whereby the host (STB) stores the purchased cryptogram and, after having already used the cryptogram once to make a request to the central system (CS) for the purchased asset, the host repeats the request to the central system (CS) for the same asset, the cryptogram further comprises a variable portion (VAR), which should necessarily be changed between requests. It follows that no two cryptograms should have exactly the same content.

Changing the cryptogram after it has been used can be achieved using a generator of pseudo-random values, the generator residing on the movie card. Cryptograms processed in this way will comprise a variable portion that is different for each cryptogram. The variable portion (VAR) may be authenticated by the signature (SIG) so that it cannot be changed on the fly by the host (STB) without such change being detected by the central system (CS) during authentication of the cryptogram. Alternatively, the host (STB) could generate the pseudo-random value to be included in the cryptogram requested from the movie card.

The cryptograms presented to the central system are stored at the central system (CS) to be used for further checking whenever a new cryptogram is presented. If the same cryptogram is received a second time, or if a cryptogram is received whose variable portion is the same as the variable portion of a previously received cryptogram, the authorization for the requested asset is not given.

The central system (CS) can track and build statistics of the use of the assets. These statistics can be used to reward the copyright owner of the asset.

Embodiments disclosed herein provide further advantages to be realized, for example, in the management of trailers, thereby ensuring that such trailers are always valid and up-to-date. A trailer typically could be a short extract of soon-to-be-released asset for example. In a DVD, the trailers are always the same and may become quickly out of date (e.g., "Available in your theater in May 2010"). The central system can select the proper up-to-date trailers from the database according to various criteria, such as the type of asset, the current policy agreement with the copyright owners, the assets previously viewed by the same host, etc., and send the correct trailers before sending the requested asset.

Advantages are also realized in the management of the advertisement material. The user could have the choice of different movie cards, being sold at different prices, for the same film. For a lower price, the user has to view advertisements and, for a higher price, the film may be watched ad free. For this purpose, the cryptogram not only contains the description of the asset, but also a description of the management of the asset (M_DATA). FIG. 2 shows the structure of a cryptogram with management data according to this embodiment. It should be appreciated that, although FIG. 2 is used to illustrate the current embodiment as well as the previous embodiment, the current embodiment may be combined with the previous embodiment. Alternatively, the current embodiment may be implemented separately from the previous embodiment. One example of the management data (M_DATA) is to change the advertisement policy. In one example, there will be no advertisements, no trailers and the asset is immediately available without interruption, whereas in another example, the other management data (M_DATA) can allow trailers and the interruption of the asset for advertisement purposes.

The management data (M_DATA) can also comprise a maximum number of presentations. The central system keeps track of each request for the asset based on a given cryptogram and denies further requests when that the maximum number of presentations has been reached.

According to another embodiment, the reader may take the form of an NFC-enabled table upon which the movie card may be placed. The table is sufficiently large to allow for a plurality of movie cards to be placed thereupon. Moreover, the surface area of the table may be configured such that different portions of the surface of the table may have different significances, thereby allowing for different commands to be formulated depending on which movie cards are placed on certain portions of the table.

According to another embodiment, instead of the movie card corresponding to a particular movie, the movie card could give the right to view programs from a certain channel. Placing a first movie card on the table would give the user the right to view programs from a first channel. The NFC-enabled table could be connected to a set-top box. In this embodiment, the set-top box is no longer the reader because the NFC-enabled table is the reader. The set-top box then functions in the normal way—i.e., it receives the rights from the table which reads the cryptogram from the movie card, and allows the decryption of the program from the requested channel. Of course, closely related to the embodiments where the host device (i.e., the set top box) is the reader, in these embodiments the movie card may still correspond to a particular movie and placing the movie card on the table simply replaces the step of having the host device read the movie card, since the table is now the reader. In such a case, placing the movie card on the table is equivalent to making a request for a particular movie.

The NFC-enabled table of the embodiment described above effectively allows for an intuitive selection of media content on a screen. According to an embodiment, instead of having a table on which the movie cards are placed, it is the screen itself which is NFC-enabled, and placing a movie card close to the screen is the way that the request is made for the movie. Again, the request can be further interpreted depending on where on the screen the approach of the movie card is made. Similarly, further interpretation may be provided depending on the number of movie cards presented at a time. For example, placing two different movie cards close to the screen (or on the table in the embodiments where an NFC-enabled table is used) may be equivalent to issuing a command to view two channels (or two films) in a picture-in-picture mode and a suitably adapted set-top box would be made to interpret the gesture as such. A first channel (or movie), corresponding to the first movie card, may then be displayed in a main window, while a second channel (or movie), corresponding to the second movie card, may be displayed on a second window, perhaps a smaller one. Furthermore, the position at which each tag/card was presented could be interpreted as being an indication of where on the screen (or table) the corresponding channel or movie is to be presented.

Different types of authentication methods may be used in combination with any of the embodiments described herein, especially when a movie card is not anonymous. One example of a non-anonymous type of movie card is when a smartphone is used as the movie card. In this case, the movie card may be used to identify its user. When a movie card is used to identify its user, it is possible to include features such as e.g., personalization per user or parental control, whereby a child using a movie card to view content from a certain channel, for example, will only be allowed to view content that has been approved for him/her to view, which may be a subset of the content available on that channel.

When a movie card is placed near the screen or on the table, its identification and possibly its position can be passed to the set-top box and appropriate action is taken.

Such appropriate action may be e.g.:
 selecting a particular channel;
 selecting a user's profile (parental control, preferred channel list);
 organizing the display of channels on various part of the display, in particular when more than one tag is detected; and/or
 selecting a mode such as PVR, EPG.

The movie cards can also be the physical token of a purchased game, giving access to the gaming environment according to the rights attached to the card. Multiple players on the same table or parental control can be associated with these cards, each relating to a set of on-line games with specific access rules and restrictions.

Another application is to use the movie cards as loyalty cards or customer identification for doing on-line shopping (e.g., to get discount or collect rewards points) or to access a reward environment where multiple rewards are presented on the display table according the cards left on the table and the available reward points. Another way to use the table is to recognize a plurality of NFC loyalty cards on the table (e.g., one per friend, family member, etc.) and to sum all of the reward points to collectively choose a reward from the proposed choices on the table.

Another possibility is to have the cards associated with various ingredients available in the home and by recognizing the cards, the table launches an application with a selection of menus that can be cooked with the available ingredients. This removes the burden of entering the available ingredients by hand on a computer. Instead, the application makes proposals based on what was put on the table. According to another embodiment, the NFC-enabled table is used to estimate the weight of the objects that are put on it and thus, calculate the available quantities of each of the added ingredients.

The NFC-enabled table then becomes the entry point for multiple family applications through the use of movie cards (it should be appreciated that the movie cards are no longer specifically attached to movies in these latter embodiments and may simply be referred to as cards) and possible extensions like the estimation of weight or size due to the relevant sensors included in the NFC-enabled table. Sensing can be done through a touch-sensitive screen of the table by estimating the weight and size of the area pressed, when adding a new ingredient; the screen calculates the addition in size and weight. Other technologies such as e.g., an electric field may be used to estimate the weight as well as piezoelectric supports of the screen for the weight estimation. The table or the screen may therefore be described as being touch-sensitive. It should be appreciated that "touch-sensitive" can also encompass a proximity sensitivity such that even if physical contact is not made with the screen or the table, the NFC configuration provides proximity sensitivity equivalent to touch without actually requiring a physical touch to be made.

Additionally or alternatively, according to still another embodiment disclosed herein, the position of a card on the screen or table being significant in the interpretation of an associated command, the card itself may comprise electronic circuitry, including one or more sensors such as a camera, microphone, tilt sensor, an accelerometer or an angle detector. A movie card according to this embodiment may have any or all of these features within it. When a smartphone is used as a movie card for the purpose disclosed herein it is easy to see how such features may be incorporated. Using such a movie card, it is now possible for the position, attitude or movement of the card to be significant in providing a command or selecting an application. Shaking the smartphone, for example, may activate the NFC device. Placing the smartphone on the table in an upside down configuration could select application A, while placing the smartphone on its side would select application B. The microphone may be used to convey to the card which application to execute. Turning the card through 90 degrees could select different default applications. For example, in a first position a first application is a default application to be selected, whereas turning the card through 90 degrees would select a different application as the default and another 90 degrees for another application and so on.

According to yet a further embodiment, each angle from a set of predetermined angles could correspond to an application from a set of different predetermined applications. In this case, when a phone (i.e., card in this context) recognizes that it is being held at 35 degrees the phone will launch a first application, while recognizing a different angle, e.g., 52 degrees, the phone will launch a different application. One of the applications could be an authentication routine, for example, or the sending of the cryptogram to the host. In this embodiment, the table could be configured so that when the card is placed thereon at exactly the 35 degree angle, the cryptogram is sent to the host, thereby beginning the process of requesting the movie.

Any of the embodiments described herein may include an authentication step. A further embodiment takes advantage of the fact that the movie card, when in the form of a device such as e.g., a smartphone comprises information associating the card to its owner and therefore can be used in the authentication process and may be used to facilitate parental control techniques. The usual way of configuring parental control features is via a remote control device. Remote control devices, when used for entering parental control features are not very secure, especially when used to enter a supposedly secret PIN code, for example. A curious child, strategically positioned at the time a careless parent is entering his PIN number, may be able to detect and reproduce the PIN number thereby gaining access to the parental control settings. An NFC-enabled smartphone, on the other hand, used as a card in this embodiment, allows for its user to be identified when close to the NFC-enabled host device (STB), thereby allowing the host device to restore a previously stored configuration related to the card (SC). The configuration may include parental control information, favorite channels, user-specific profiles and so on. As such, purchases of certain paying services may be restricted depending on which card is presented near the host device (STB). Targeted advertising also becomes possible in this embodiment since the owner of the card is identifiable.

The invention claimed is:

1. A system for providing access to conditional access digital media content, the system comprising:
   a receiver adapted to receive the conditional access digital media content from a streaming server having access to the conditional access digital media content;
   a media player, connected to the receiver, for playing the conditional access digital media content; and
   a secure element for providing authorization to access the conditional access digital media content, the secure element being a portable physical element separate from both the media player and the receiver;
   wherein:
      the receiver is configured to receive the conditional access digital media content from the streaming server via a remote connection;
      the secure element comprises a memory and is configured to store in the memory a single prerecorded cryptogram, the cryptogram comprising a single unique identifier and a signature for verifying an authenticity of the cryptogram, the single unique identifier identifying the conditional access digital media content;
      the receiver is configured to receive the cryptogram from the secure element, the receiver being further configured to provide said access upon authentication of the cryptogram; and
      the secure element comprises a wireless interface and the receiver comprises a reader having a wireless interface to receive the cryptogram from the secure element, the wireless interface of the reader and the wireless interface of the secure element are configured to operate according to a short-range wireless communication protocol.

2. The system according to claim 1, wherein the wireless interface of the reader and the wireless interface of the secure element are configured to operate according to an NFC standard protocol.

3. The system according to claim 1, wherein the secure element comprises a SIM card and the reader comprises a SIM card reader for reading from the secure element.

4. The system according to claim 1, further comprising:
   a touch-sensitive element comprising a further reader configured to operate according to an NFC standard protocol for reading the cryptogram from the secure element, the touch-sensitive element being connected to the receiver; and
   wherein the receiver is configured to receive the cryptogram from the touch-sensitive element.

5. The system according to claim 4, wherein the touch-sensitive element is a screen.

6. The system according to claim 5, wherein the screen is a part of the media player.

7. The system according to claim 4, wherein the touch-sensitive element is a table upon which the secure element may be placed.

8. The system according to claim 1, wherein the secure element further comprises a sensor to detect an orientation of the secure element, the orientation being used to formulate a command for the receiver.

9. The system according to claim 1, wherein the secure element further comprises a motion detector to detect a movement of the secure element, the movement being used to formulate a command for the receiver.

10. The system according to claim 4, wherein the touch-sensitive element is configured to interpret a plurality of secure elements simultaneously placed in closed proximity thereto.

11. The system according to claim 1, wherein the secure element comprises information pertaining to a particular user, said information being used to authenticate a communication between the secure element and the receiver.

12. A device for providing access to conditional access digital media content, the device comprising:
   a receiver adapted to receive the conditional access digital media content from a streaming server via a remote connection, the receiver being configured to receive a cryptogram from a secure element, the receiver being further configured to provide said access upon authentication of the cryptogram; and
   a media player, connected to the receiver, for playing the conditional access digital media content;
   wherein the secure element is a portable physical element separate from both the media player and the receiver, the secure element comprising a memory and being configured to store in the memory a single prerecorded cryptogram, the cryptogram comprising a single unique identifier of a single digital media content and a signature for verifying an authenticity of the cryptogram, the single unique identifier identifying the conditional access digital media content; and wherein the secure element comprises a wireless interface and the receiver comprises a reader having a wireless interface to receive the cryptogram from the secure element, said wireless interface being configured to operate according to a short-range wireless communication protocol.

13. The device according to claim 12, wherein the wireless interface of the reader and the wireless interface of the secure element are configured to operate according to an NFC standard protocol.

14. The device according to claim 12, wherein the secure element comprises a SIM card and the reader comprises a SIM card reader for reading from the secure element.

15. The device according to claim 12, wherein the receiver is configured to receive the cryptogram from a touch-sensitive element connected to the receiver.

16. The device according to claim 12, wherein the secure element further comprises a sensor to detect an orientation of the secure element, the orientation being used to formulate a command for the receiver.

17. The device according to claim 12, wherein the secure element further comprises a motion detector to detect a movement of the secure element, the movement being used to formulate a command for the receiver.

18. The device according to claim 12, wherein the secure element comprises information pertaining to a particular user, said information being used to authenticate a communication between the secure element and the receiver.

* * * * *